J. W. Walters,
Clothes Sprinkler,
No. 79,531. Patented June 30, 1868.
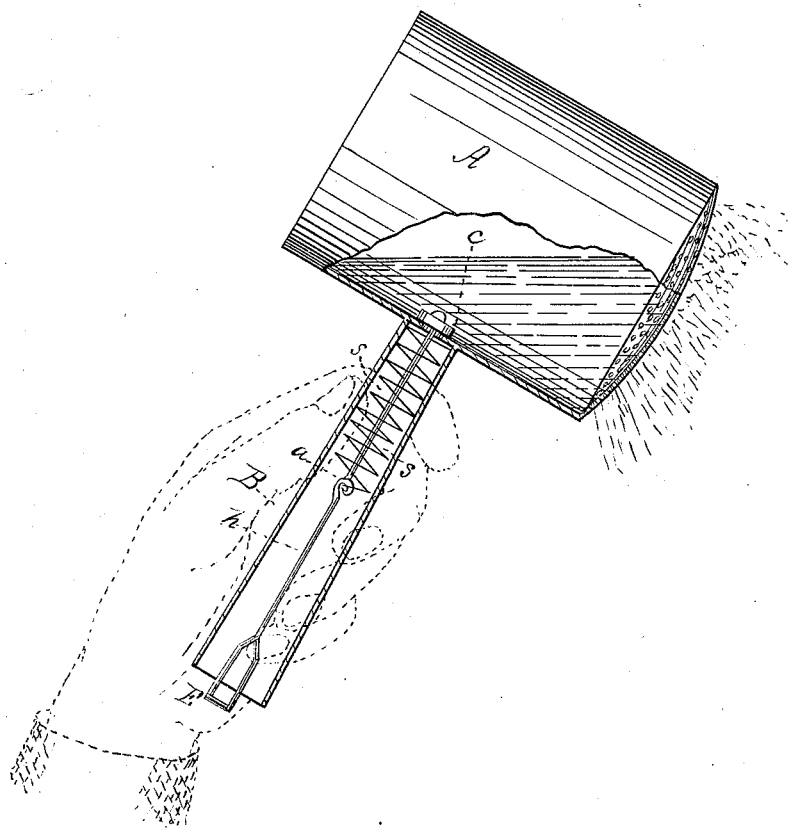
Witnesses
Theo Tische
W. Trevin
Inventor
J. W. Walters
Per Munn &
Attorneys

United States Patent Office.

J. W. WALTERS, OF TIFFIN, OHIO.

Letters Patent No. 79,531, dated June 30, 1868.

IMPROVED CLOTHES-SPRINKLER.

The Schedule referred to in these Letters Patent and making part of the same.

TO ALL WHOM IT MAY CONCERN:

Be it known that I, J. W. WALTERS, of Tiffin, in the county of Seneca, and State of Ohio, have invented a new and improved Cloth-Sprinkler; and I do hereby declare that the following is a full, clear, and exact description thereof, which will enable those skilled in the art to make and use the same, reference being had to the accompanying drawings forming part of this specification, in which—

The drawing represents a middle section through the sprinkler.

A is a drum, of tin or zinc.

B, a hollow handle, containing a helical spring, S, coiled around the stem, $h$, of a valve, $c$, which latter closes an aperture in the wall of the sprinkler, as shown.

A number of small perforations are made in one head or end of the drum, for sprinkling the water, as shown.

The spring $s$ is coiled around the stem $h$, one end of said spring being hooked securely into a twist or loop, $a$, on the stem.

The other end of the spring rests against the wall of the drum, at the bottom of the handle B, as shown.

The end E of the stem projects slightly from the handle B, for the purpose of enabling the valve to be opened by pressure upon the said end.

The spring exerts its tension to keep the valve closed tightly, so that the water within the drum cannot escape at the handle.

When it is desired to fill this sprinkler, the drum is immersed in water, and the end E pressed on, which opens the valve and allows the air to retire before the water entering at the holes in the head.

When sufficiently full, the finger is removed from the end E, and the valve closes.

The water now within the drum will not escape unless the drum is shaken downwards, when the water will then fall through the holes in spray.

Thus the sprinkler can be set aside on the table, when in use, without fear of spilling its contents.

It is desirable that, in the operation of sprinkling cloth, the water should be equally distributed on its surface in a finely-divided state, which end is perfectly accomplished by my improved sprinkler.

Being cheap, durable, and simple, it will be found a useful implement to those having to sprinkle cloths, or to distribute liquid, for any purpose, in an equable spray.

I claim as new, and desire to secure by Letters Patent—

As a new article of manufacture, a clothes-sprinkler, constructed as described, and consisting of a vessel, A, having a perforated head, and provided with a hollow handle, B, valve $c$, stem E $h$, and springs $s$, all arranged and operating as set forth.

J. W. WALTERS.

Witnesses:
A. H. BYERS,
ELVERO PERSONS.